United States Patent

[11] 3,624,358

| [72] | Inventor | Jeffrey M. Bevis<br>Long Beach, Calif. |
|---|---|---|
| [21] | Appl. No. | 641,851 |
| [22] | Filed | May 29, 1967 |
| [45] | Patented | Nov. 30, 1971 |
| [73] | Assignee | Chalco Engineering Corporation<br>Gardena, Calif. |

[54] MAGNETIC BRAKE
4 Claims, 2 Drawing Figs.

[52] U.S. Cl. .................................................. 235/61.11R,
179/100.2 S, 226/48, 340/174.1 K
[51] Int. Cl. .................................................. G11b 15/22,
B65h 25/32, G06k 7/08, G11b 5/40
[50] Field of Search ........................................... 235/61.11,
61.114, 61.112, 61.113; 242/55.13, 54, 54.1, 154;
340/174.1 K, 174.1 C, 173 MS, 174.1 O;
179/100.2; 226/128, 95, 54, 48, 155, 153

[56] References Cited
UNITED STATES PATENTS

| 2,953,369 | 9/1960 | Goldberg.................. | 226/144 X |
| 3,051,953 | 8/1962 | Shepard .................. | 226/48 X |
| 3,176,927 | 4/1965 | Irazoqui .................. | 242/154 X |
| 3,248,030 | 4/1966 | Ganzhorn.................. | 235/61.11 X |
| 3,306,509 | 2/1967 | Mahn .................. | 226/48 X |
| 3,431,403 | 3/1969 | Seno.................. | 235/61.11 |
| 3,119,020 | 1/1964 | Olson et al.................. | 179/100.2 S X |

*Primary Examiner*—Thomas A. Robinson
*Assistant Examiner*—Robert M. Kilgore
*Attorney*—Julius L. Rubinstein ABSTRACT: In order to achieve the high speed brake operation required for use in tape readers, without producing an accompanying objectionable high heat loss requiring auxiliary cooling systems for the tape reader, an induction coil having an inductance much higher than the inductance of the coils in the magnetic brakes is connected in series with a transistor and a constant current generator. One end of the brake coil is connected to the junction between the induction coil and a transistor. The brake coils are in series with a second transistor and the brake coils and the second transistor are in parallel with the first transistor. Appropriate circuitry is provided for causing the first transistor to become conductive while the second transistor becomes nonconductive and means are provided for causing these transistors to change their mode each time an appropriate pulse is applied to the circuitry. When the first transistor becomes nonconductive, interruption of the current in the induction coil produces a large voltage at the junction of the inductance coil and the first transistor. This high voltage rise is very rapid because of the rapid interruption of the current in the coil (L di/dt). Consequently, the high voltage connected across the brake coils abruptly actuates them. When a brake off pulse is applied to the circuitry, the second transistor becomes nonconductive and the first transistor becomes conductive. This in turn causes the energy in the brake coils to discharge through the second transistor.

PATENTED NOV 30 1971 3,624,358

INVENTOR.
JEFFREY M. BEVIS
BY
Julius L. Rubinstein
ATTORNEY

MAGNETIC BRAKE

Heretofore the conventional way of operating fast action magnetic brakes for tape readers was to apply a comparatively high voltage across a resistance in series with the brake coils. The resistance was used to substantially establish the current value. In addition, a transistor was in series with the resistor and brake coils which, in turning on and off, produced the voltage ($Ldi/dt$) across the brake coils. With this arrangement the applied voltage V equals the voltage across the resistance plus the voltage across the brake coil (or $V=ir+Ldi/dt$). It is apparent that this is a differential equation and it's solution is $i=v/a8[1-e-tr/l]$.

An analysis of this equation indicates that one could build up the current through the brake coils more rapidly and hence obtain a more rapid brake response by increasing the magnitude of the resistance. However, this approach is not desirable because an increase in the magnitude of the resistance would increase the already objectionable heat loss across the resistors. This, of course, would require further auxiliary cooling systems, which this invention was designed to eliminate. Alternatively, the magnitude of the inductance might be decreased to obtain the same result. However, in order to obtain the required magnetic force for braking, it would then be necessary to increase the applied current. This again would increase the heat loss so that additional cooling systems would be required. These additional cooling systems would increase the cost of the tape reader and it's complexity.

What is needed therefore, and comprises an important object of this invention, is to provide a fast acting magnetic brake for a tape reader which has low power dissipation.

This and other objects of this invention will become more apparent when better understood in the light of the accompanying specification and drawings wherein.

Figure 1:
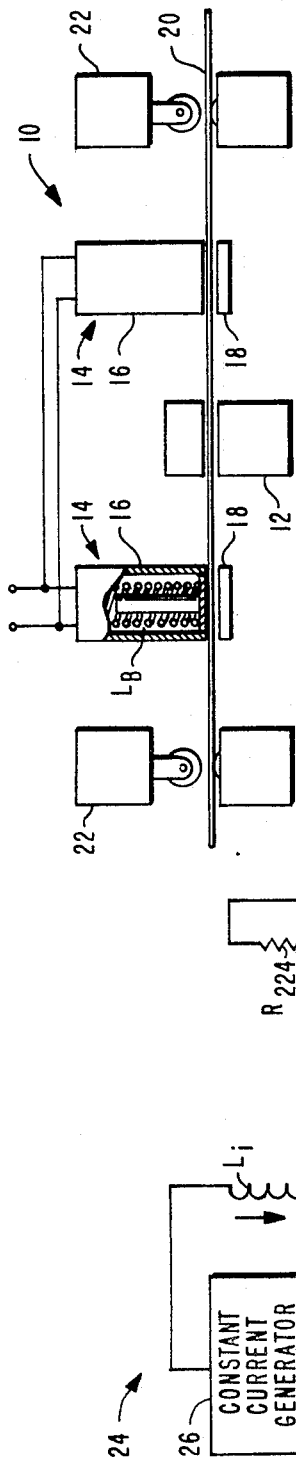
FIG. 1 is a diagrammatic view showing the arrangement of the magnetic brakes in association with other parts of the tape reader.
Figure 2:
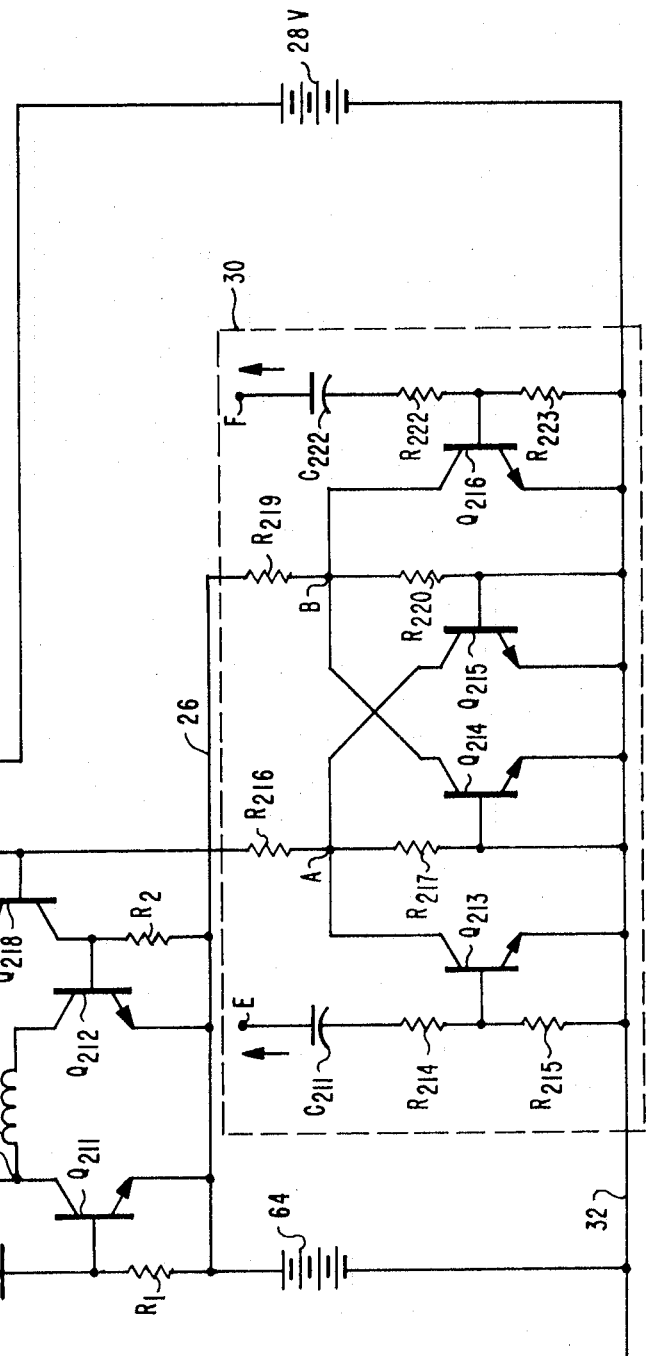
FIG. 2 is a circuit diagram of the circuitry connected to the coils of the magnetic brakes.

Referring now to FIG. 1 of the drawings, a tape reader, indicated generally by the reference numeral 10, includes a reading device 12. Magnetic brakes 14 are disposed on each side of the reading device in a manner well known in the art. These magnetic brakes include a fixed housing 16 and a movable gripping armature face 18. The tape 20 to be read passes over the reading device 12 and between the fixed housing 16 and the gripping armature jaws 18 of the magnetic brakes. Magnetically actuated pinch-rollers 22 are disposed beyond each magnetic brake for moving the tape in either direction in a manner well known in the art. When a signal is applied to stop the tape, both brakes are applied simultaneously. The brakes must be designed so the tape can be stopped and started at speeds up to 1,000 times per second.

The circuit diagram 24 for the fast acting magnetic brakes include a constant current generator 26, which in the embodiment shown is designed to produce a constant 2-amp current for the particular brake coils used. One end of this constant current generator is connected to one end of a large inductance coil $L_i$. $L_i$ has an inductance very much larger than the inductance of the brake coils. This is to permit the inductance $L_i$ to maintain a constant energy level during high speed brake operation. The opposite end of the inductance $L_1$ is connected to the NPN transistor $Q_{211}$. The current path extends on through a 6-volt generator back to the opposite side of the constant current source 26.

One end of the brake coils $L_B$ is connected to terminal C at the junction between the inductance coil $L_i$ and the collector of transistors $Q_{211}$. The opposite end of the brake coils is connected to the collector of transistor $Q_{212}$. The emitters of NPN transistors $Q_{211}$ and $Q_{212}$ are connected together at the 6-volt line 26.

A PNP control transistor $Q_{218}$ is connected so the collector is connected to the base of transistor $Q_{212}$. The emitter of $Q_{218}$ is connected to the base of transistor $Q_{211}$ through the diode 28. Biasing resistor $r_1$ and $r_2$ are connected between the bases and emitters of transistors $Q_{211}$ and $Q_{212}$ as shown. In addition, a biasing resistor $r_3$ is connected between the base and emitter of transistor $Q_{218}$.

As will be explained below, transistors $Q_{211}$ and $Q_{212}$ act as electrical switches and they open and close alternately so that when one is closed or conductive the other one is open or nonconductive. Further, as will be explained below, whenever one of the transistors opens, the interruption of the current flow through one of the coils generates the required high voltage for fast brake response. This high voltage persists only a short time, until the current is built up (200 microseconds) and thereafter dropped to a negligible value, so that the net power loss or heat generated is negligible.

A brake flip-flop 30, which is a bistable circuit, is used to control the action of the brakes. This brake flip-flop comprises NPN transistors $Q_{214}$ and $Q_{215}$. The emitters of these transistors are connected to the common ground line 32. The collector of transistor $Q_{214}$ is connected to terminal B which in turn is connected to the base of transistor $Q_{215}$ through the voltage dropping resistor $R_{220}$. The collector of transistor $Q_{215}$ is connected to terminal A in the circuit, which in turn is connected to the base of transistor $Q_{214}$ by the voltage dropping resistor $R_{217}$. In addition, terminal B is connected to the 6-volt line 26 through the voltage dropping resistor $R_{219}$. Terminal A is connected to the base of PNP transistor $Q_{218}$ through a voltage dropping resistor $R_{216}$. Terminal A is also connected to the collector of NPN transistor $Q_{213}$ and the emitter of this transistor is connected to the ground line 32. The base of the transistor $Q_{213}$ is connected to the capacitive coupled voltage dropping network comprising capacitor $C_{211}$ which is in series with resistors $R_{214}$ and $R_{215}$. As seen, the base of transistor $Q_{213}$ is connected to the junction between resistors $R_{214}$ and $R_{211}$, and the brake on pulses, when applied at E is connected to the opposite side of the capacitor $C_{211}$.

Terminal B is symmetrical with terminal A in that it is directly connected to the collector of the NPN transistor $Q_{216}$, while the emitter of transistor $Q_{216}$ is connected to the ground line 32. A capacitive coupled voltage dropping network, consisting of capacitor $C_{222}$, in series with resistances $R_{222}$ and $R_{223}$, is provided. The base of transistor $Q_{216}$ is connected to the junction between the resistances $R_{223}$ and $R_{224}$. The brake off pulse is applied at F on the opposite side of capacitors $C_{222}$. A 28-volt generator is connected between the ground line 32 and the emitter of the PNP transistors $Q_{218}$ to the current limiting resistor $R_{224}$.

In operation, recalling that transistors $Q_{211}$ and $Q_{212}$ serve as switches and control the current to the brake coils $L_B$, and starting from a condition when transistor $Q_{211}$ is conductive (switch closed) and transistor $Q_{212}$ is nonconductive (switch open), which corresponds to a situation where the brake is not on, a momentary pulse is applied to terminal E, as when a sprocket hole passes over a photocell in the photoelectric tape reader. When this happens the pulse increases the potential on the base of NPN transistors $Q_{213}$ and causes it to become conductive. This, in turn, decreases the potential at point A in flip-flop 30. When the potential at point A drops it causes the base of the NPN transistor $Q_{214}$ to drop making transistor $Q_{214}$ less conductive.

When transistor $Q_{214}$ becomes less conductive, the potential at terminal B increases and the base of NPN transistor $Q_{215}$ becomes more positive so transistor $Q_{215}$ becomes conductive. This has the effect of holding the potential down at terminal A after the momentary brake pulse has terminated. In this respect the circuitry connected with transistor $Q_{215}$ acts as a holding circuit. While the potential at terminal A is down, the base of PNP transistor $Q_{218}$ is held down, which causes that transistor to suddenly turn on.

When transistor $Q_{218}$ turns on, bias current flows through the resistor $R_{224}$ to the base on NPN transistor $Q_{212}$ and turns it on (switch is closed). At the same time NPN transistor $Q_{211}$ is turned off (switch open) because of the forward voltage drop across diode 28 which prevents the flow of bias current to the base of transistor $Q_{211}$.

When this happens the constant current flowing through the inductance coil $L_i$ is directed to the brake coils $L_B$ and through the now conductive transistor $Q_{212}$ while no current flows through the transistor $Q_{211}$. At the same time, the interruption of the electric current through the inductance coil $L_i$ causes a rise in potential at terminal C and across the brake coils $L_B$. This is due to the inductive action of coil $L_i$, and the rapid change in current flow through it ($V=Ldi/dt$). This potential increase results in a very rapid buildup (2200 microseconds) of current in the brake coils so that the magnetic force from brake coils $L_B$ builds up very rapidly. However, as soon as the current through the brake coil $L_i$ reaches a steady state condition (in this case 2 amps), the voltage across the brake coils $L_B$ drops to a few tenths of a volt. This is due to the low internal resistance of the brake coils.

When the magnetic brakes are on the tape is stopped. To release the brake a momentary pulse is applied to terminal F in the brake flip-flop 30. This raises the potential on the base of transistor $Q_{216}$ and causes it to become conductive and in this situation transistors $Q_{215}$ and $Q_{216}$ act together as a holding circuit as explained above.

When the transistor $Q_{216}$ becomes conductive it drops the potential at terminal B momentarily which turns off transistor $Q_{215}$ and causes the potential at terminal A to increase.

The rise in potential at terminal A turns off transistor $Q_{218}$, which in turn turns on transistor $Q_{211}$ (switch closed), and turns off transistor $Q_{212}$ (switch open).

The current flow through the brake coils $L_B$ is interrupted and the current flow through the inductance coil $L_i$ bypasses the brake coils $L_B$ to transistor $Q_{211}$. Consequently, the voltage across the brake coils $L_B$ again rises to approximately 150-volts. However, this is at the opposite polarity, so that the current flow through the brake coil decreases rapidly to zero (200 microseconds). Consequently, the magnetic energy in the brake coils is discharged rapidly through the transistor $Q_{212}$ rapidly turning off the brake.

Obviously many modifications and variations of the present invention are possible in the light of the above teachings. It is therefore to be understood that within the scope of the appended claims the invention can be practiced otherwise than as specifically described.

I claim:

1. In a tape reader having means for reading perforations on the tape and means for driving the tape, magnetically actuated brakes, said brakes including brake coils, and an electric circuit connected to said brake coils, said electric circuit having a low internal resistance energy storing element for rapidly increasing the current flow through the brake coils without substantial heat loss so that the brakes may be actuated rapidly enough to permit the tape to be stopped and started at speeds up to 1,000 times per second and so auxiliary cooling equipment for the tape reader will not be required, said electric circuit comprising a first coil, said first coil in series with said brake coils, firs and second electrical switches serving as alternate action switch means so that when said first switch is closed said second switch is open and when said second switch is closed said first switch is open, said first switch connected to the junction of the first coil and said brake coils and serving to short out said brake coils when the first switch is closed, said second switch providing an alternate path for said electric current when said first switch is open and said second switch is momentarily closed, said first coil having an inductance very much greater than the inductance of said brake coil, and said means for simultaneously opening said first switch and closing said second switch when the brakes are to be applied whereby electromagnetic energy stored in said first coils produces a high voltage across the brake coils causing a very rapid current buildup in the brake coils whereby the brakes can be actuated rapidly.

2. The tape reader described in claim 1 wherein said first and second electrical switches are first and second transistors, said transistors connected together in such a way that when one transistor is conductive the other transistor is nonconductive, and means for suddenly causing one transistor to become conductive and the other nonconductive when brakes are to be applied and for suddenly causing said one transistor to become nonconductive and said other transistor to become conductive when the brakes are to be released.

3. The tape reader described in claim 2 including a constant current generator in series with the first coil for causing a constant electric current to flow through said first coil when said one transistor is conductive, said first coil functioning as a circuit generator when said first transistor suddenly becomes nonconductive, whereby a current equal in magnitude to said predetermined current from said constant current generator suddenly flows to said brake coils permitting said brake coils to be operated rapidly when said first transistor becomes conductive and said second transistor becomes nonconductive.

4. The tape reader described in claim 3 wherein said electric circuit includes a bistable circuit, said bistable circuit having one terminal for receiving a brake on pulse and another terminal for receiving a brake off pulse, a control transistor, said brake on pulse causing said control transistor to become conductive, and when the brake off pulse is applied to another terminal said bistable circuit flips to another stable position causing said control transistor to become nonconductive, said control transistor connected to said first and second transistors in such a way that when said control transistor becomes nonconductive said first transistor becomes nonconductive and said second transistor becomes conductive causing the brakes to be applied, and when said control transistor becomes conductive said first transistor becomes conductive and said second transistor becomes nonconductive causing said brakes to be released.

* * * * *